United States Patent [19]

Barthelat et al.

[11] Patent Number: 4,491,397
[45] Date of Patent: Jan. 1, 1985

[54] SIGHTING HEADS FOR PERISCOPE INSTALLATIONS, PARTICULARLY FOR SUBMARINES

[75] Inventors: René Barthelat, Taverny; Alain Dore, Conflans Ste Honorine, both of France

[73] Assignee: Societe d'Applications Generales d'Electricite et de Mecanique Sagem, Paris, France

[21] Appl. No.: 383,123

[22] Filed: May 28, 1982

[30] Foreign Application Priority Data

Jun. 2, 1981 [FR] France .................................. 81 10935

[51] Int. Cl.³ ............................................. G02B 27/64
[52] U.S. Cl. ................................................... 350/500
[58] Field of Search ......................... 350/500, 540–544

[56] References Cited

U.S. PATENT DOCUMENTS 3,762,795 10/1973 Bezu ..................................... 350/500

FOREIGN PATENT DOCUMENTS 1547129 12/1969 Fed. Rep. of Germany ...... 350/500
1478451 3/1967 France ................................. 350/541

Primary Examiner—Jon W. Henry
Attorney, Agent, or Firm—Larson and Taylor

[57] ABSTRACT

The invention relates to a periscope installation sighting head, particularly for a submarine, located at the upper end of a periscope mast and including at least one optical sighting unit off-set laterally with respect to the axis of the mast. To stabilize, in azimuth and in elevation, the image provided by the sighting unit when the mast is animated by a swinging movement, the sighting unit is positioned on a mobile support with two gyrostabilized axles and a trajectory correction device as a parallel-sided plate is interposed in the path of the signals delivered by said unit and is slaved to the azimuth of the unit so that the signals are transmitted to the mast substantially along the optical axis of the latter.

3 Claims, 6 Drawing Figures

SIGHTING HEADS FOR PERISCOPE INSTALLATIONS, PARTICULARLY FOR SUBMARINES

The present invention relates to improvements in or to periscope installation sighting heads particularly for submarines, these view-finder heads being located at the upper end of a periscope mast, and it is concerned with improving more particularly those sighting heads which include at least one optical sighting unit off-set laterally with respect to the axis of the mast of the periscope installation.

When a periscope installation is installed on board a mobile vessel animated by a rocking movement (for example rolling and/or pitching for a submarine), the result on the sighting head of said periscope installation is a movement amplified in the proportion to the length of the mast which carries it. Through this fact, any observation by means of the periscope installation is difficult; in particular, in the case of submarine submerged at a shallow depth, it is impossible in practice to take a reading by the sextant method through this unstable periscope installation.

It is therefore an object of the invention to improve the sighting heads concerned so that they give better satisfaction, under the various conditions of their use, than sighting heads hitherto employed, and particularly to design sighting heads which permit observation even when the vessel, particularly a submarine, which they equip is animated by a movement such as a rocking movement, for example of rolling and/or of pitching.

Accordingly it is an object of the invention to provide, in a sighting head of the aforementioned type, to stabilize in azimuth and in elevation the image supplied by the offset optical sighting unit when the mast is animated by a rocking movement, for the optical sighting unit to be positioned on a mobile support with two gyrostabilized axles.

However, the movements imposed on the optical sighting unit, with respect to the mast, by gyrostabilization would risk, in preserving an optical sighting unit of restricted size compatible with the small space available in a periscope sighting head, causing too considerable a deviation of the optical signals transmitted which would not then penetrate further, in whole or in part, into the mast.

It is therefore necessary to provide, in combination with the above means, for a trajectory correction device to be interposed in the path of the optical signals delivered by the optical sighting unit and to be servo-coupled to the azimuth of the optical sighting unit so that the optical signals are transmitted in the mast substantially along the optical axis of the latter.

A periscope installation equipped with a sighting head arranged according to the invention procures very great facility of observation to the extent that there are eliminated, at least in part, the disadvantages due to undesirable movements of the vessel. In particular, in the case of a submarine submerged at slight depth and hence capable of being subjected to rolling and/or pitching movements, the periscope sighting head according to the invention procures a stability of the image which considerably improves observation. In particular, it is henceforth possible to carry out reading by the sextant method through the periscope installation, which was not possible by current methods until now; it is also possible to use checking and/or observation and/or measuring apparatus, placed inside the submarine, which ensures their function through the periscope installation (for example surveillance by infra-red camera).

Advantageously, when the optical sighting unit is designed to cover a given angular field in azimuth, the trajectory correction device for the optical signals is constituted by a parallel-sided plate whose orientation is servo-coupled to the stabilization in azimuth of the mast of the periscope installation and which is positioned so as to be perpendicular to the light beam when the sighting unit is oriented in the axis of the above-indicated field.

In a preferred application, the sighting head having one or other of the above-mentioned features according to the invention comprises a second sighting unit, the two sighting units being arranged on each side of the axis of the mast of the periscope installation and borne by the same support with two gyrostabilized axes.

The invention will be better understood on reading the detailed description which follows of a preferred embodiment given purely by way of non-limiting example. In this description, reference is made to the accompanying drawings in which.

Figure 1:
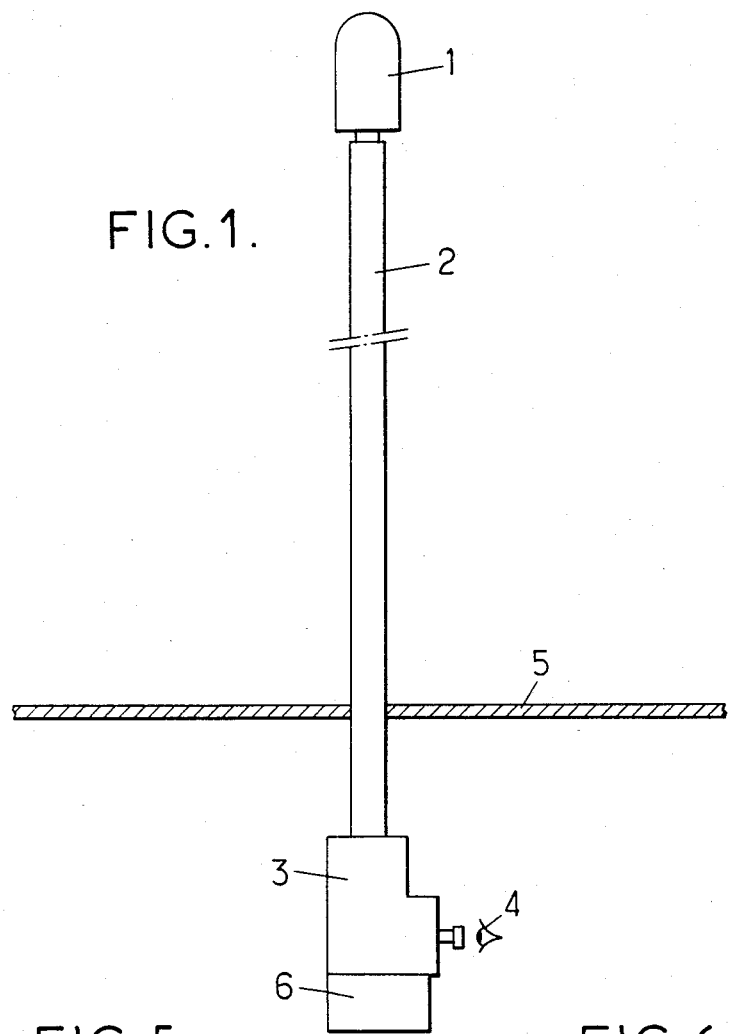
FIG. 1 is a diagrammatic view of a periscope installation equipped with a periscope sighting head arranged according to the invention.

Referring first of all of FIG. 1, there is shown diagrammatically, to establish ideas, a periscope installation for a submarine comprising a sighting head 1 borne at the upper end of a mast 2 (shown in hoisted position for observing). In addition, an observation station 3 or eye-piece box, located inside the submarine, is arranged to receive the optical signals conducted through the mast 2 from the sighting head 1 and, for example, to permit direct observation thereof by an observer 4.

In FIG. 1, is shown a conventional periscope installation, in which the mast 2 passes through the main hull 5 of the submarine in water-tight manner and, supports the observation station 3 at its lower end. However, of course, other configurations are possible for the transmission of the optical signals through the hull 5, without departing from the scope of the invention.

Still by way of example, it is assumed that the periscope installation of FIG. 1 is arranged to operate with visible light radiation, which can be transmitted idirectly to the observer 4 through the observation station 3 by means of a suitable optical system (not shown), and with infra-red radiation which is processed in a device 6 before being sent back into the observation station 3.

Without departing from the scope of the invention, there may be provided, besides means for direct observation by the observer 4, recording, display, etc. means for the image.

Of course, the periscope installation also includes all the conventional auxiliary members (not shown), such as those intended to ensure water-tight support of the mast, to ensure control of the axial and rotary movements of the mast, to drive and guide the mast in its movements etc.

Figure 2:
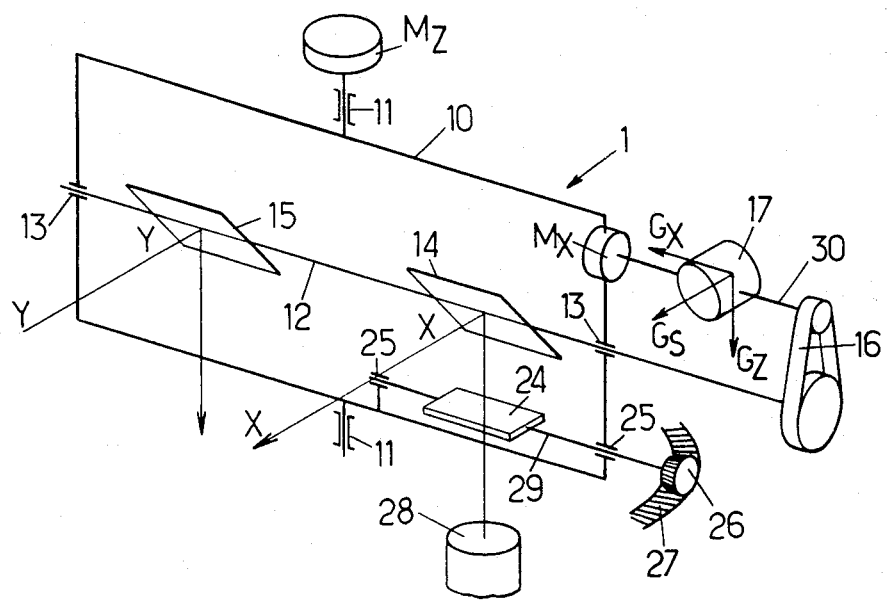
FIG. 2 shows, in diagrammatic perspective, the principal elements of the sighting head according to the invention.

In FIG. 2, is shown, in diagrammatic perspective, the principal elements of the sighting head according to the invention.

This sighting head 1 includes a first frame 10 pivotably mounted, through bearings 11 around a vertical axis, a motor for servo-coupling in azimuth $M_Z$ being provided to rotate the abovesaid first frame 10 around its vertical pivoting axle.

A second frame 12 is pivotably mounted, through bearings 13, on the first frame 10 around a horizontal axis, a motor for servo-coupling in elevation $M_X$ being provided to rotate the abovesaid second frame 12 around its horizontal pivoting axle.

This second frame 12 bears an optical sighting unit 14, generally constituted by a mirror or a prism, off-set with respect to the vertical pivoting axis of the frame 10.

This second frame 12 also carries a complementary sighting unit 15, which will be more explicitly considered below, which is also off-set with respect to the vertical pivoting axle of the frame 10 (the sighting units 14 and 15 may for example be arranged symmetrically with respect to the vertical axis of the frame 10).

For the servo-coupling in elevation of this second frame 12 by means of the motor for slaving in elevation $M_X$, a reduction device 16 is provided, procuring, between the slaving motor $M_X$ and the second frame 12, a reduction ratio of ½.

This being the case and to stabilize the optical sighting unit 14 as well as the complementary sighting unit 15, a gyroscope with two degrees of freedom 17, of which one of the sensitivity axes $G_X$ is parallel to the horizontal pivoting axis of the second frame 12, whose axis of rotation $G_S$ is parallel to the sighting line XX or YY respectively of the optical sighting unit 14 or of the complementary sighting unit 15, and whose sensitivity axis $G_Z$ is perpendicular to the axes $G_X$ and $G_S$, is borne by the shaft 30 of the motor $M_X$ driving the reduction device 16.

Figure 3:
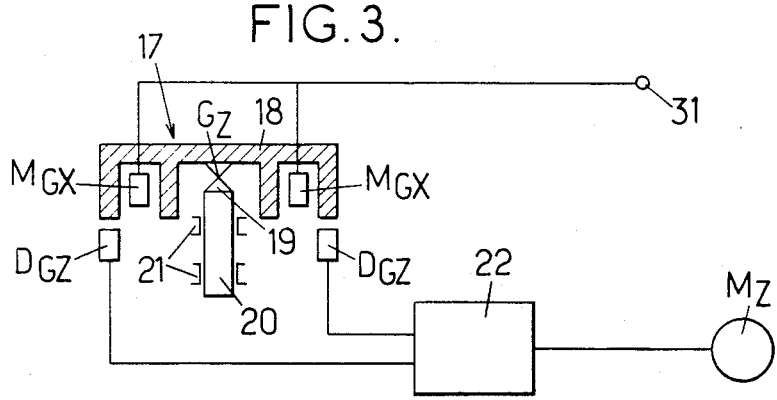
FIGS. 3 and 4 show, respectively in section through perpendicular planes, the gyroscope of the sighting head according to the invention.
Figure 4:
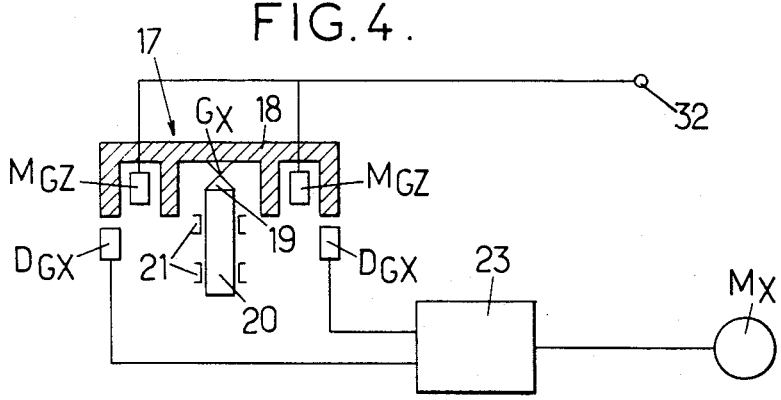

This gyroscope 17 includes, as shown in FIGS. 3 and 4, a rotor 18 borne, through a Hoocke joint 19, by a shaft 20, held by bearings 21.

Two azimuth position detectors $D_{GZ}$ are provided as well as an elevation precession torque motor $M_{GX}$ (FIG. 3).

In the same way, two elevation position detectors $D_{GX}$ are provided, as well as an azimuth precession torque motor $M_{GZ}$ (FIG. 4).

The two azimuth position detectors $D_{GZ}$ provide signals which are demodulated and amplified in a cell 22 and which control the motor for the slaving in azimuth $M_Z$ of the first frame 10 (FIG. 3).

The two elevation position detectors $G_{GX}$ deliver signals which are demodulated and amplified in a cell 23 and which control the motor for slaving in elevation $M_X$ of the second frame 12.

The orientation of the rotary axle $G_S$ of the gyroscope is effected by attitude control signals applied at 31 to the elevation precession torque motor $M_{GX}$ and at 32 to the azimuth precession torque motor $M_{GZ}$.

According to the invention and as shown in FIG. 2, the first frame 10 comprises a trajectory correction device 24 cooperating with the optical sighting unit 14 and pivotably mounted, through bearings 25, around an axle 29 parallel to the pivoting axle of the second frame 12.

This trajectory correction device 24 is inserted in the path of the optical signals provided by the optical sighting unit 14 and it is slaved to the azimuth of the first frame 10. To this end, it is advantageous to provide, on the pivoting axle of the trajectory correction device 24, a pinion 26 meshing with a circular rack 27 located in a plane perpendicular to the vertical rotary axis of the frame 10 and centered on said axis, this circular rack 27 being fast to the mast bearing the input optical system 28.

The trajectory correction device 24 has the function of arranging for the optical ray coming along the optical axis XX to the optical sighting unit 14 and reflected by said unit to be sent to the optical input system 24 of the mast by being constantly directed along the axis of this optical system (and hence the mast) whatever the rotary movements imparted to the sighting unit 14 by the stabilizing system.

In order to preserve a simple and inexpensive construction in the sighting head, the trajectory correction device 24 may be constituted by a parallel-sided plate fastened to the axle 29.

Figure 5:
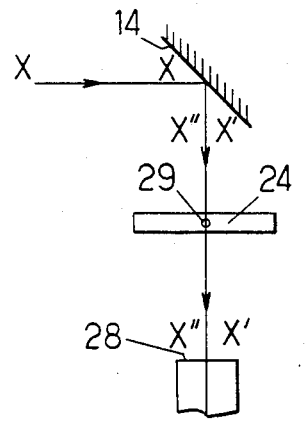
FIGS. 5 and 6 show, diagrammatically, a part of the sighting head of FIG. 2 respectively in two distinct operational positions.

For a nil azimuthal movement of the sighting unit 14 (FIG. 5), the optical axis of reflection X'X' of said unit coincides with the optical axis X"X" of the input optical system 28 of the mast. The parallel-sided plate 24 is kept perpendicular to the axis X'X' and to the axis X"X".

Figure 6:
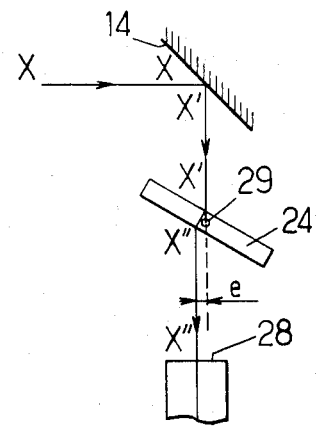

On the other hand, when the sighting unit 14 has undergone azimuthal movement under the action of a stabilizing system (FIG. 6), the optical axes X'X' and X"X" are no longer coincident. By reason of the servo-coupling of the inclination of the parallel plate 24 to the azimuth of the first frame 10, the light rays passing through the parallel plate 24 undergo double refraction resulting in lateral shift of their trajectory corresponding to the separation e existing between the axes X'X' and X"X".

The slaving of the parallel plate 24 to the azimuth of the first frame 10, the thickness of the plate and the refractive index of its constituent material are to be selected to obtain the desired deviations of the light ray according to the displacements of the axis X'X' caused by the stabilizing system.

An optical sighting unit 14 stabilized in accordance with the invention may typically cover an azimuthal angular field of ±20°.

As is self-evident and as emerges already from the foregoing, the invention is in no way limited to those of its embodiments and types of application which have been more especially envisaged; it encompasses, on the contrary, all modifications.

We claim:

1. Sighting head in a periscope installation, said sighting head being located at the upper end of a periscope mast and comprising at least one optical sighting unit having an optical axis out of alignment with respect to the axis of the mast of the periscope installation, wherein, so as to stabilize in azimuth and elevation the image provided by the out of alignment optical sighting unit when the mast is swinging, the out of alignment optical sighting unit is supported by a movable support having two gyrostabilized axles so as to direct the optical signals issued from the sighting unit parallel to the axis of the periscope mast, and a trajectory correction device is provided in the path of the optical signals issued from the sighting unit and is coupled to the azimuth of the sighting unit so that said optical signals are transmitted to the periscope mast substantially along the axis thereof.

2. Sighting head according to claim 1, wherein the optical sighting unit covers in azimuth a given angular field, the trajectory correction device being constituted by a parallel-sided plate whose orientation is coupled to the stabilization in azimuth of the mast of the periscope installation and which is positioned so as to be perpendicular to the light rays when the optical sighting unit is oriented in the axis of the above said field.

3. Sighting head according to claim 2, comprising a second sighting unit, the two sighting units being positioned one on each side of the axis of the mast of the periscope installation and borne by the support with two gyrostabilized axles.

* * * * *